UNITED STATES PATENT OFFICE.

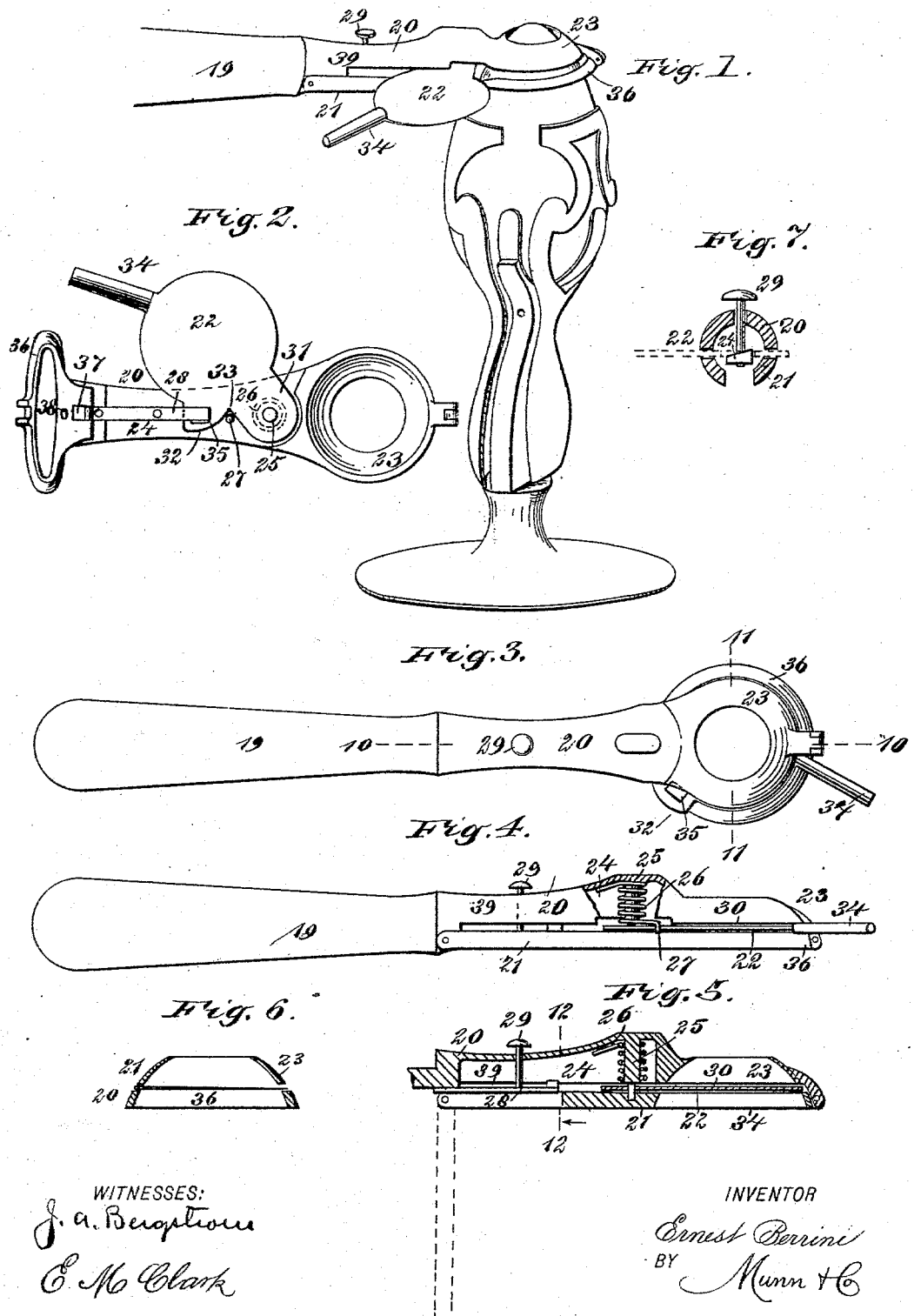

ERNEST BERRINI, OF TACOMA, WASHINGTON.

EGG-CUTTER.

SPECIFICATION forming part of Letters Patent No. 490,133, dated January 17, 1893.

Application filed July 16, 1892. Serial No. 440,211. (No model.)

*To all whom it may concern:*

Be it known that I, ERNEST BERRINI, of Tacoma, in the county of Pierce and State of Washington, have invented a new and Improved Egg-Cutter, of which the following is a full, clear, and exact description.

The object of the invention is to provide a knife of simple, durable and economic construction, which knife is provided with a socket to receive one end of the egg shell, and a spring-controlled and latch-governed plate capable of being locked in an open position and tripped in a manner to enable the spring to throw it to a closed position, and when assuming the latter position the blade cuts through that portion of the shell located beneath the socket of the knife.

The invention consists in the novel construction and combination of the several parts, as will be hereinafter fully set forth and pointed out in the claim.

Reference is to be had to the accompanying drawings forming a part of this specification, in which similar figures of reference indicate corresponding parts in all the views.

Figure 1 is a perspective view of an egg cup, illustrating the cutter in position upon an egg held by the cup; Fig. 2 is a bottom plan view of the egg cutter, one of its members being open, and illustrating the position the members are made to assume when the cutter is to be cleaned; Fig. 3 is a plan view of the egg cutter, the knife being in its closed position; Fig. 4 is a side elevation of the egg cutter, a portion of the casing being broken away; Fig. 5 is a longitudinal section through the cutter, taken practically on the line 10—10 of Fig. 3; Fig. 6 is a transverse section through the cutter taken essentially on the line 11—11 of Fig. 8; and Fig. 7 is a transverse section taken practically on the line 12—12 of Fig. 5.

With relation to the egg cutter, this cutter consists primarily of a handle 19 and two body or shell members 20 and 21, while a knife 22, has play between the shell or body members. The handle 19 may be of any suitable or approved construction, and may be of any desired contour or size. The upper body or shell section 20, is securely fastened to the handle, and terminates at its outer end in a socket 23, shaped as the frustum of a cone, and the upper end of the socket is ordinarily open.

In the under face of the upper shell or body section 20 a longitudinal chamber 24, is produced, and this chamber is shown best in Figs. 4 and 5. The forward end of the chamber, or that next to the socket 23, is of greatest depth, and is provided with a downwardly-projecting post 25, the post being of greater length than the depth of the chamber, as shown in Fig. 5. This post is surrounded by a spring 26, one end of the spring being secured to one wall of the chamber; and the opposite or lower end of the spring is bent downward, as illustrated at 27 in Fig. 4. Where the shell section joins the handle 19 a spring latch 28, is secured at one end to the under side of the shell and the latch extends longitudinally and forwardly beneath the chamber 24, the head of the latch facing upward, and this latch may be pressed downward by manipulating a button 29, located above the upper face of the shell section and connected with the latch, as shown also in Figs. 4 and 5 and likewise in Fig. 7. Upon the lower end of the post 25 the knife 22 is pivoted and plays in a slot 30 between the body sections 20 and 21 of the cutter. The body of this knife is practically and preferably of disk shape, as shown in Figs. 1 and 2, the body of the knife being provided with a lip or extension 31, by means of which it is pivotally attached to the post 25; and it is further provided with a second lip or extension 32, located adjacent to the pivotal lip, whereby a recess 33, is formed in the knife between the two lips, as shown best in Fig. 2, and practically opposite the recess the body of the knife is provided with a handle 34. The recess 33, is provided to receive the downwardly-bent portion 27 of the spring 26; and the lip 32 is adapted to serve as a keeper, as it has formed therein an opening 35, to receive the head of the latch 28. The lower shell section 21, is hinged at its rear end to the rear portion of the upper shell section at the handle 19. The lower shell section 21, terminates at its outer end in a socket 36, which is shaped also as the frustum of a cone, and is adapted to constitute a continuation of the conical shape imparted to the socket 23 of the upper shell. The lower shell section is provided with a slot 37 in its body portion, enabling the latch 28 to be forced downward when the two shell sections are in engagement; and the lower shell section is also provided with a recess 38, adapted to receive the lower end of the post 25 upon which the knife is pivoted. The two shell sections are adapted to be closed one upon the other; and in order that the knife may move laterally and horizontally between the two sections, the upper shell section in its under face is provided with a recess 39, as shown in Figs. 1, 4 and 5, and the outer ends of both of the shell sections, that is, the socket portions of these sections, are provided with a locking device of any approved construction, as for instance, one socket may be provided with a keeper and the other with a projection to enter the keeper, and the two portions of the latch or locking device may be connected by passing a pin through them.

In the operation of the device, the knife is carried backward against the tension of the spring 26, until the head of the latch 28 enters the keeper upon the knife. The knife will now be held in the position shown in Figs. 1 and 2, in which it is at an angle to the shell sections, and the body of the knife is removed from between them. The sockets of the shells are brought over the upper end of the egg, as shown in Fig. 1, the knob 29 is then pressed downward, which disengages the latch 28 from the knife, and the spring will thereupon force the knife between the sockets of the two shell sections, and will sever the upper or cap portion of the egg.

This device is exceedingly simple, it is capable of being operated expeditiously and conveniently by parties seated at the table or by a waiter, and with perfect safety to the manipulator.

Having thus described my invention, I claim as new, and desire to secure by Letters Patent,—

The combination with the handle, the body section formed of the upper chambered member 20 having an egg socket 23, and the lower member 21 hinged at its inner end to the upper member to swing downwardly therefrom and having a socket 36 registering with socket 23, a latch connecting the socketed ends of the two members, and the post 25 in the chamber 24 of the upper member, of the knife 22 pivoted on said post, the torsional spring 26 on the post and throwing the knife, the latch 28 engaging the knife when retracted, and means for releasing the latch, substantially as set forth.

ERNEST BERRINI.

Witnesses:
A. J. McKEANY,
T. C. THOMPSON.